March 25, 1969  P. C. WEISS  3,434,390
VALVE CONTROL APPARATUS
Filed April 25, 1966  Sheet 2 of 5

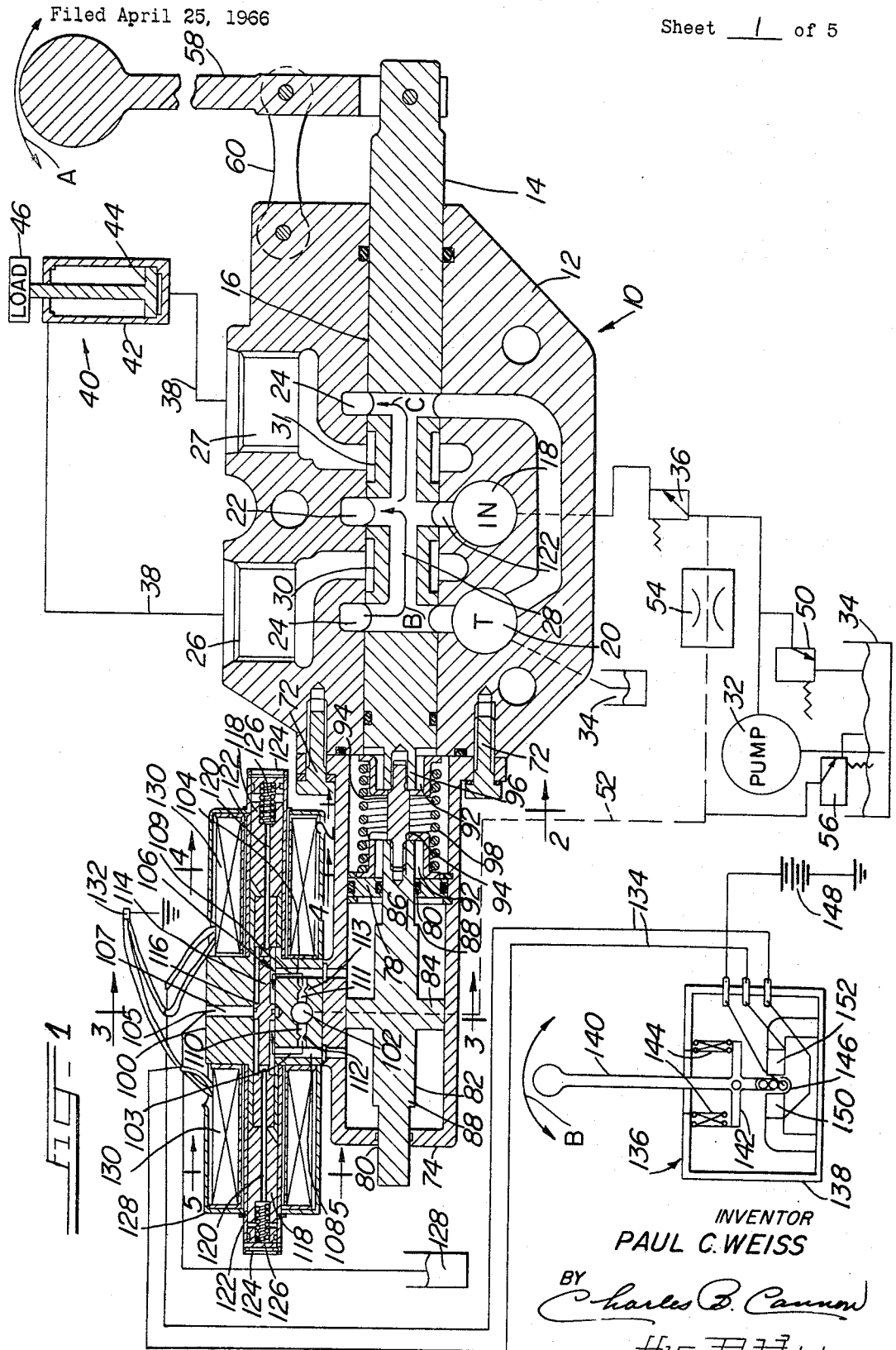

INVENTOR
PAUL C. WEISS
BY Charles B. Cannon
HIS ATTY

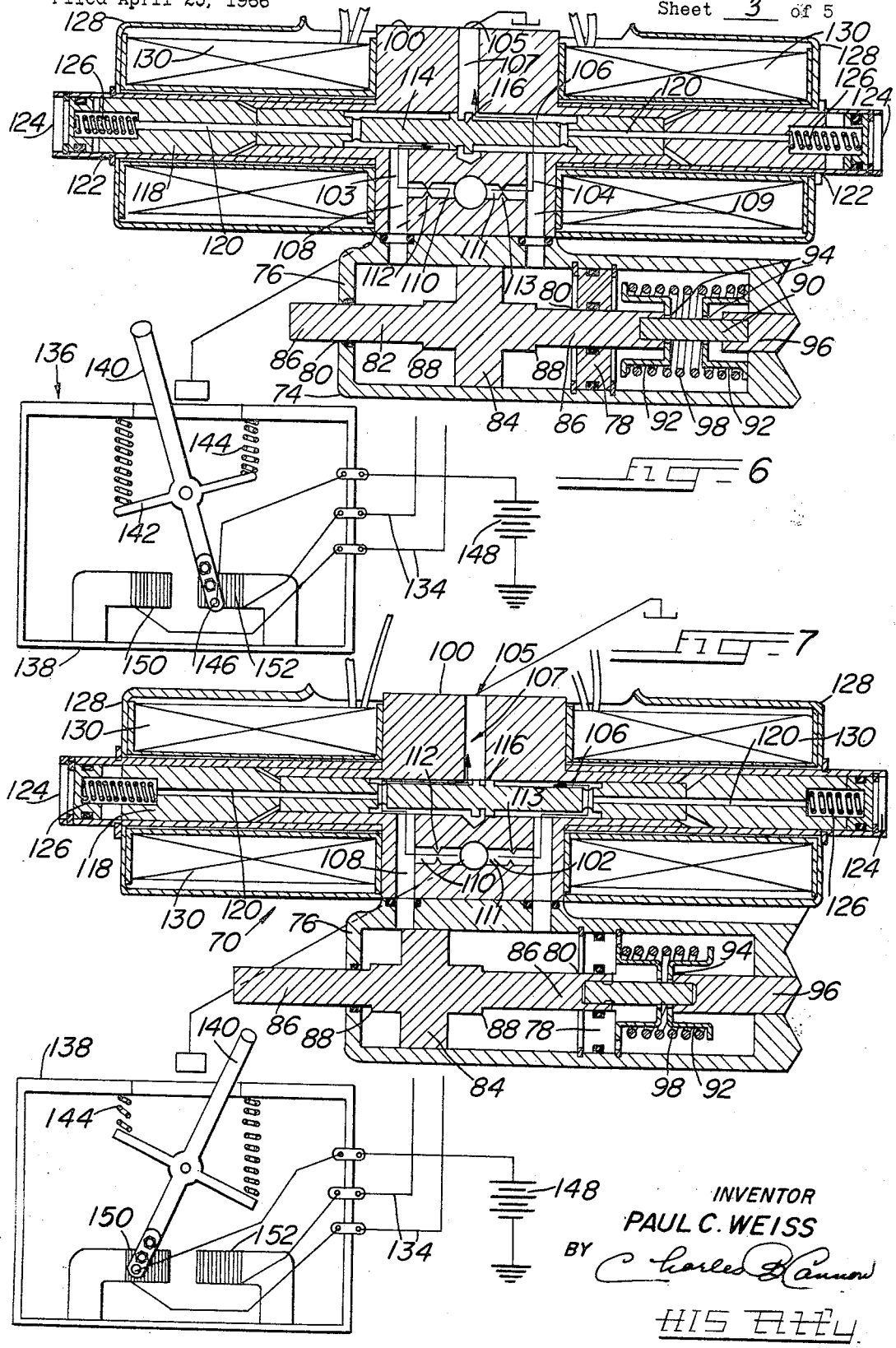

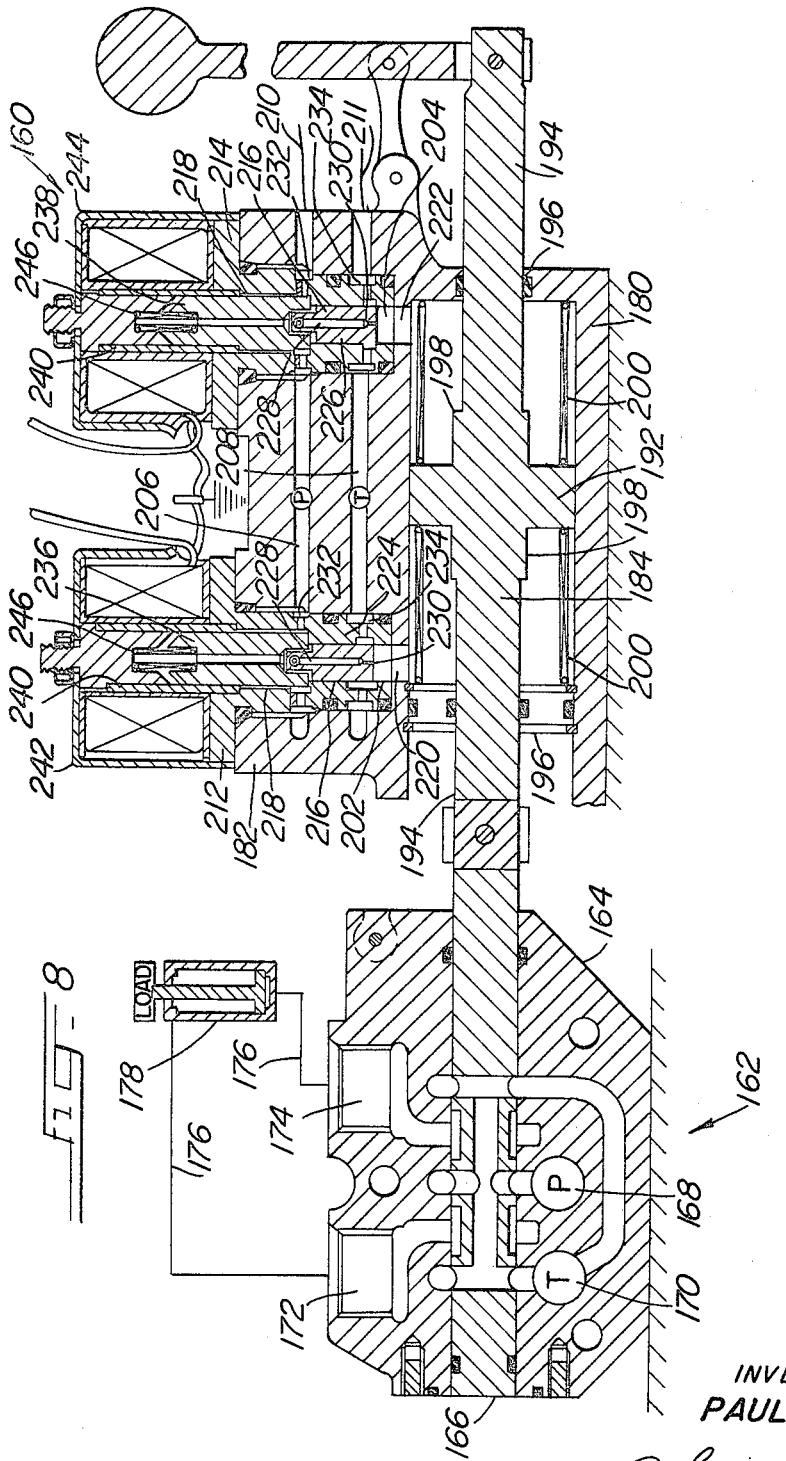

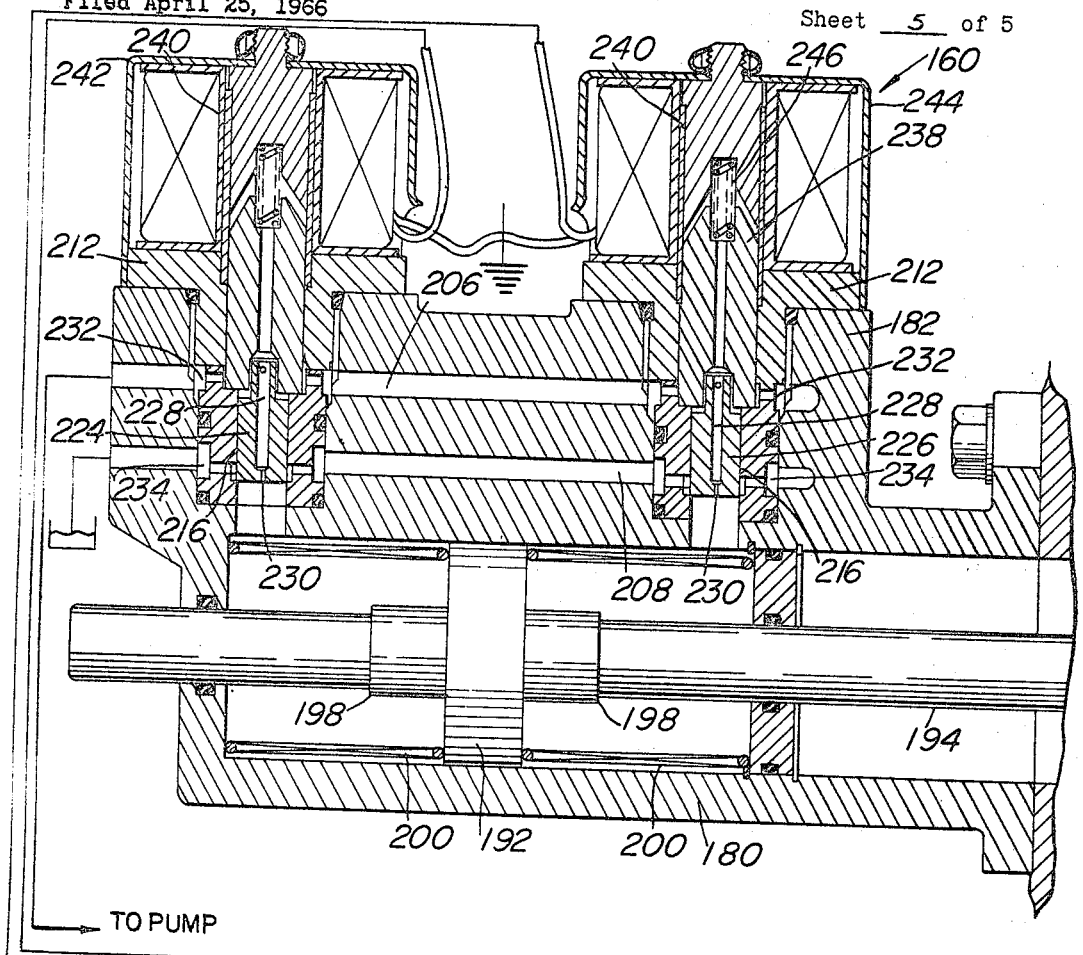
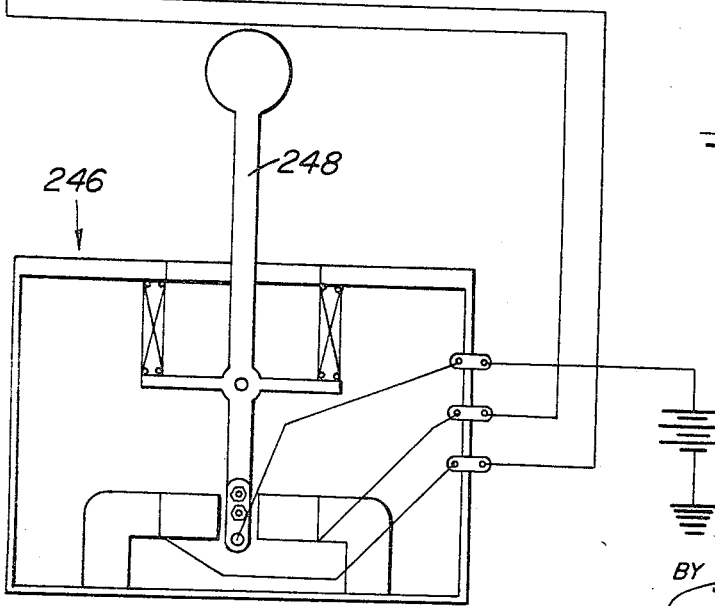

United States Patent Office 3,434,390
Patented Mar. 25, 1969

3,434,390
VALVE CONTROL APPARATUS
Paul C. Weiss, Evanston, Ill., assignor, by mesne assignments, to American Bosch Arma Corporation, Garden City, N.Y., a corporation of New York
Filed Apr. 25, 1966, Ser. No. 544,931
Int. Cl. F15b *13/043, 13/044;* F16k *31/05*
U.S. Cl. 91—51      10 Claims

ABSTRACT OF THE DISCLOSURE

Apparatus for selectively controlling position of piston-like element within hydraulic cylinder wherein the piston is subject to a force in one direction and this force is opposed in a controllable manner by the steps of directing hydraulic fluid to flow from one pressure level to another through two restrictive orifices, maintaining the cylinder on one side of the piston in fluid communication orifices and selectively varying the size one of said orifices.

---

This invention relates to the control of hydraulic devices, and more particularly it concerns a novel method and apparatus for controlling an hydraulic valve from a remote location.

The present invention finds particular utility in heavy hydraulic machinery such as lift trucks, cranes, and the like wherein very heavy loads must be moved over considerable distances. It is important, when moving these loads by means of hydraulically-actuated equipment that the valve operation in the hydraulic system be under full and precise control at all times so that the load may be precisely and accurately positioned. This control should be such that the rate of movement of the hydraulically-actuated load be adjusted in any desired increments. This, thus permits precise positioning of the load and prevents dangerously large pressure surges in the system. In most hydraulically-actuated equipment such as cranes and the like, the operative members are controlled remotely, as by electromechanical actuation from the crane cab. In such arrangements, solenoids have been employed to acuate either the main hydraulic valve or a pilot valve in the hydraulic system of the equipment. Heretofore, these solenoids have been operative to travel the valve spool between two positions, i.e. full on and full off. To try to compensate for the thus resultant pressure surge in the system, the spools and internal valve members have been formed of special construction or other auxiliary steps employed to overcome the problems presented by such pressure surges.

The present invention provides direct and proportional remote control of the hydraulic valves so that hydraulically-actuated loads may be easily and accurately manipulated from a remote location without the undesirable pressure surges in the system with their resultant hazardous operating conditions. With the present invention, this is accomplished without the special valve constructions or auxiliary types heretofore required.

According to the present invention the controlled valve is proportionally actuated from a remote location by applying to it a controlled hydraulic pressure in the direction of its acuation while resiliently restraining it in the opposite direction. The controlled valve thus moves a distance proportional to the controlled pressure applied to it, until the control pressure is changed, whereupon it will attain a new fixed position in response to the changed control pressure.

This variable hydraulic pressure is achieved according to the present invention by causing hydraulic fluid to flow serially through a pair of restricted orifices, one of which is controllable; and communicating the pressure between the orifices to the hydraulic valve.

In the illustrative embodiments, the controllably-restricted orifice takes the form of a resiliently-restrained pilot spool valve which is actuated by a solenoid. A variable voltage is applied to the solenoid from a remote control unit located in the crane cab or the like. The solenoid exerts a force on the valve in proportion to the voltage applied to it from the remote control unit. The solenoid thus actuated moves the pilot spool to a position proportional to the setting on the remote control unit. This in turn determines the pressure between the two restricted orifices in the pilot valve. The pilot valve, in communication with the main hydraulic valve operating the load-carrying members of the system, thus controls the pressure applied to the main hydraulic valve in accordance with an directly proportional to the setting of the remote control unit. This, in turn, accurately and precisely controls the actuation and positioning of the load-carrying members of the system.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings, forming a part of the specification, wherein:

FIG. 1 is a side elevational view, taken in section, along with wiring and hydraulic schematics of a hydraulic valve actuating system embodying the present invention;

FIG. 6 is an enlarged fragmentary view of the actuator portion of the system of FIG. 1, as seen in one stage of operation;

FIG. 7 is a view similar to FIG. 6 as seen in another stage of operation;

FIG. 8 is a side elevational view, taken in section, along with wiring and hydraulic schematics of a further valve actuating system embodying the present invention; and FIG. 9 is an enlarged fragmentary view of the actuator portion of the system of FIG. 8.

Figure 3:
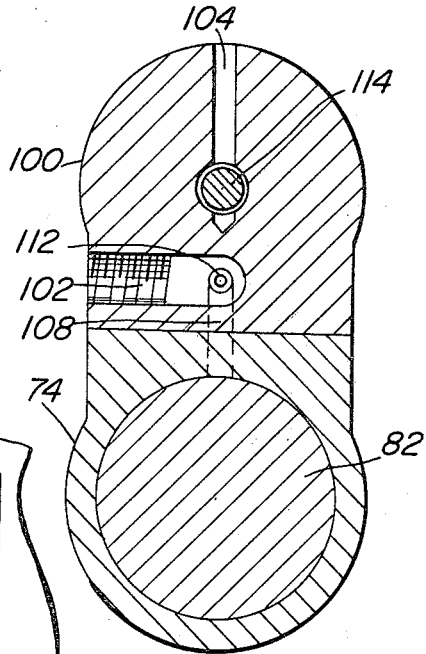
FIG. 3 is a section view taken along line 3—3 of FIG. 1.

Referring to the drawings and specifically FIG. 1, there is disclosed a main hydraulic valve assembly 10 which is controlled by the novel arrangement of the present invention. This main hydraulic valve assembly includes a valve housing 12, and a valve spool 14 arranged for close fitting sliding movement along an elongated bore 16 in the valve housing 12. The main valve housing 12 is formed with an inlet port 18 and an exhaust or tank port 20; the inlet port 18 communicating with the bore 16 at a central annular region 22 thereof, and the exhaust port 20 communicating with the bore 16 at the annular region 24 on opposite sides of the central region 22. The housing 12 is further formed with a pair of output ports 26 and 27 which communicate with the bore 16 between the central annular section 22 and the outer annular sections 24. The valve spool 14 is formed with internal passageways 28 which, when the valve is centered as shown in FIG. 1, provide communication between the inlet and exhaust ports 18 and 20, respectively. The spool 14 is further formed with axially displaced annular grooves 30 and 31.

As can be seen in FIG. 1, when the valve spool 14 is centered as shown, the inlet and exhaust ports 18 and 20 communicate with each other, while each of the output ports 26 and 27 is individually sealed. When the valve spool 14 is moved to the left as viewed in FIG. 1, the left annular groove 30 of spool 14 places the exhaust port 20 into communication with the left outward port 26 and the right annular groove 31 places the inlet port 18 into communcation with the right output port 27. Thus fluid under pressure flows through port 27 while port 26 is connected to vent. When the spool 14 is moved to the right, the coupling is reversed so that fluid under pressure flows through the left port 26 and port 27 is vented.

To provide fluid under suitable pressure, hydraulic pump 32 draws hydraulic fluid from a reservoir 34 and pumps it through a pressure valve 36 and into the main valve inlet port 18 in the valve housing 12. A hydraulic power unit 40 is connected by means of hydraulic lines 38 to the output ports 26 and 27. This hydraulic power unit 40 includes a cylinder 42 and a piston 44 mounted for close fitting reciprocal movement within the cylinder. When pressurized hydraulic fluid is applied to either end of the cylinder 42, as when fluid under pressure flows from either port 26 or 27, the piston 44 is suitably actuated and load or utilization means 46 connected to the piston is appropriately displaced or positioned.

The piston moves toward the other end of the cylinder it displaces fluid out of that end, and this fluid flows back through a corresponding one of the output lines 38, through the hydraulic valve assembly 10 and back into the reservoir 34.

It will be appreciated that the direction and speed of movement of the load 46 is controlled by the positioning of the valve spool 14. Thus, as the valve spool is moved greater distances either to the left or to the right (FIG. 1), the amount of communication between the output ports 26, 27 and their respective intake and exhaust ports 18 and 20 is increased thereby allowing a greater rate of fluid flow and faster movement of the load 46 through the system.

In order to prevent sudden pressure surges in the system from being applied to the valve inlet port 18 of the valve assembly 10, there is provided a main relief valve 50 connected between the output of the pump 32 and the reservoir 34. This relief valve 50 is set to open and to pass fluid when the pressure exceeds a given set point somewhat above the normal operating pressures of the system.

To control the positioning of the main spool valve 14 from a remote location, there is provided a pilot pressure system for remote control operation. This system includes a pilot line 52 connected to the outlet of the pump 30. This pilot line 52 is provided with a restricted flow control orifice 54 which serves to maintain a smooth, even and precise, though small, flow of fluid into the pilot line 52. Pilot line 52 is also protected by means of a pilot relief valve 56 connected between the output of the restricted flow control orifice 54 and a reservoir 34.

As an emergency measure, main hydraulic valve assembly 10 may be controlled manualy as by means of a manual control arm 58 which is mounted on the valve housing 12 on the end of a pivoted link 60. The lower end of the manual control arm 58 is pivotally connected to the outer end of the valve spool 14 so that when the arm is moved in either direction along the path of the arrow A, the valve spool 14 will be caused to move correspondingly back or forth within the bore 16. It will be appreciated that when the manual control arm 58 is used, the spool 14 may be moved gradually or in predetermined increments to control the degree of valve opening in either direction. This permits control of the rate at which hydraulic fluid flows through the hydraulic valve assembly 10, and this in turn governs the speed at which the load 46 is moved by the hydraulic power unit 40.

For normal remote control operation, the present invention permits direct or proportional positioning of the hydraulic valve assembly 10, so that the main valve spool 14 can be precisely adjusted. To this end there is provided a proportionally-actuated pilot valve, designated generally at 70. This pilot valve is secured, as by bolts 72, to the end of the valve housing 12 opposite from the manual control arm 58. Pilot valve unit 70 includes a valve cylinder 74 which is mounted in alignment with the main valve spool bore 16 in the main valve housing 12. The pilot valve cylinder 74 is formed with a pair of end walls 76 and 78 which are provided with equal diameter, central openings 80. A pilot valve piston 82 is mounted for reciprocal movement within the cylinder 74. The pilot piston 82 is formed with a central portion 84 which fits closely within the cylinder 74. It is also provided with a pair of smaller diameter end portions 86 which fit within the central openings 80 in the end walls 76 and 78 of the proportional control cylinder 74. This arrangement permits the piston 82 to move back and forth within the cylinder 74 without any change to the effective piston area on either side of its central portin 84. There is also provided a shoulder 88 approximately midway between each end portion 86 and the central portion 84 of the piston. This shoulder 88 engages the inner edge of the central openings 80 to limit the amount of back and forth piston movement in cylinder 74.

Figure 2:
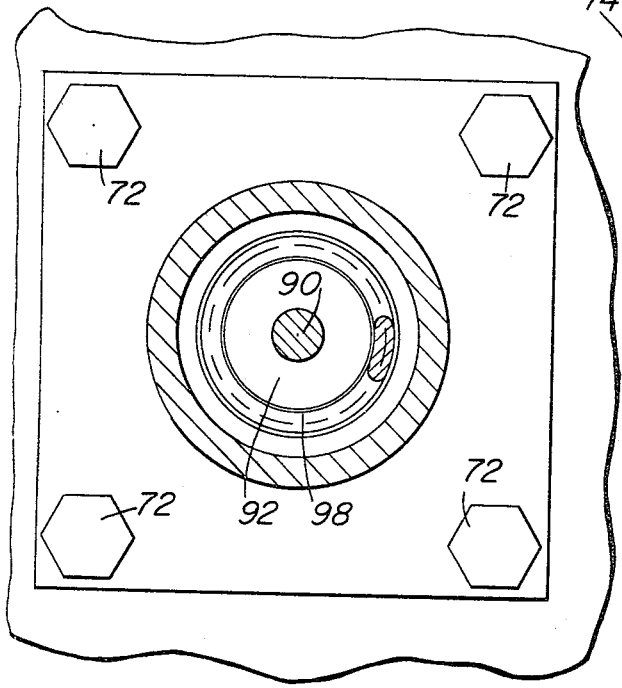
FIG. 2 is a section view taken along line 2—2 of FIG. 1.

One end of the piston 82 is attached by means of a connecting link 90 to one end of the main valve spool 14. This main valve spool 14 moves back and forth with bore 16 in direct relation to the travel of pilot valve piston 82. In the region of the connecting link 90, there are provided a pair of opposed cup shaped elements 92 which face and rest against, respectively, the outer side of the end wall 78 of the proportional control cylinder 74 and the outside of the valve housing 12. (See FIGS 6 and 7). These cup shaped elements 92 are each provided at their facing ends with openings 94 through which the connecting link 90 extends as shown in FIGS. 2, 6 and 7. The openings 94, however, are sufficiently small to prevent either the end portion 86 of the piston 82 or the corresponding end portion of the main valve spool 14 to pass therethrough.

A centering spring 98 extends between the cup shaped elements 92 and tends to hold them flat against the end wall 78 and the valve housing 12 respectively (see FIG. 1). It will be understood that by virtue of this construction, the centering spring 98 in like manner, is operative to resiliently urge the main valve spool 14 toward centered position as shown in FIG. 1, while allowing the main valve spool 14 and the pilot valve piston 82 to move together back and forth under spring restraint as hereinabove described.

As shown best in FIGS. 6 and 7, a vent control housing 100 is mounted above cylinder 74. This housing is provided with an inlet opening 102 to which the pilot line 52 is connected. Within the vent control housing 100 there are provided a pair of channels 103 and 104, each of which extends from the inlet opening 102 to a vent opening 105. This vent opening 105 is connected (as shown schematically) to the reservoir 34. Thus, as long as either of the channels 103 and 104 is open, hydraulic fluid will flow through it from the inlet opening 102 to the vent opening 105.

The separate channels 103 and 104 are formed within the vent control housing 100 by means of an upper horizontal bore 106, a central vertical bore 107 leading up to the vent opening 105 from the middle of the horizontal bore 106, a pair of longitudinally-displaced vertical bores, 108 and 109, leading down into opposite ends of the pilot valve cylinder 74 from corresponding ends of the horizontal bore 106, and a pair of lower horizontal bores 110 and 111 extending out from the inlet opening 102 to the displaced vertical bores 108 and 109. Each of the channels 103 and 104 is provided with a fixed restriction, 112 and 113 (see FIG. 3), located in the lower horizontal bores 110 and 111 respectively.

There is also provided a variable restriction further along each of the separate channels 103 and 104. This variable restriction comprises a vent control element 114, mounted for reciprocal longitudinal movement within the central horizontal bore 106. The vent control element 114 is smaller in diameter than the upper horizontal bore 106, except for an enlarged vent closure portion 116 of element 114 which fits closely within the bore 106. This enlarged vent closure portion 116 is adapted to fully close off the central vertical bore 107.

Also, when element 114 is moved along the horizontal bore 106, it will open the vertical bore 107 on either side thereof by a corresponding amount, thus opening a particular one of the channels 103 or 104 to the vent opening 105. Thus, depending on the position of the vent control element 114 in the horizontal bore 106, either both of the variable restrictions will be closed, or one of them will be open from the pilot inlet opening 102 to the vent opening 105. When the vent control element 114 is moved to open one of the channels, then hydraulic fluid will pass through that channel from the pilot inlet opening 102 through the associated lower horizontal bore 110 or 111, its associated fixed restriction, 112 or 113, through the longitudinally displaced vertical bore 108 or 109, and through the variable restriction defined between the vent closure portion 116 of the vent control element 114, to the central vertical bore 107 and the vent opening 105.

In passing through either of these channels in the vent control housing 100, the fluid experiences a pressure drop from the pilot pressure down to the vent pressure. This pressure drop takes place in two stages, the first at the fixed restriction 112 or 113, and the second at the variable restriction defined between the closure portion 116 of the vent control element 114. By controlling the opening of the variable restriction, the pressure in the region between the fixed and variable restrictions can be adjusted. That is, where opening at the variable restriction is enlarged, to promote flow through it, then a greater pressure drop will take place across the fixed-restriction so that the pressure in the region between the restrictions will be reduced. On the other hand, when the opening defined by the variable restriction is reduced, the flow rate is decreased and the pressure drop across the fixed restriction is lessened while that across the variable restriction is increased so that the pressure between the restrictions is made greater.

It will be noted that by virtue of the longitudinally displaced vertical bores 108 and 109 extending into different ends of the proportional control cylinder 74, these different ends are exposed, respectively, to the pressure in the region between the fixed and variable restriction in each of the channels 103 and 104.

Figure 4:
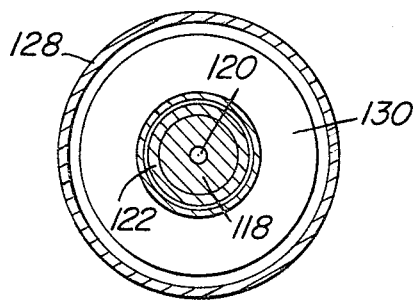
FIG. 4 is a section view taken along line 4—4 of FIG. 1.
Figure 5:
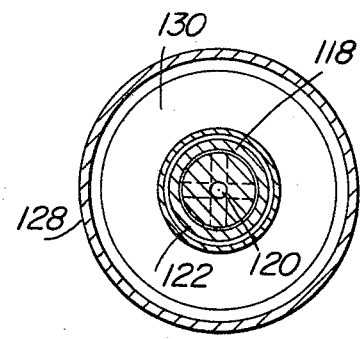
FIG. 5 is a section view taken along line 5—5 of FIG. 1.

A pair of vent control plungers 118 are mounted in alignment on either side of the vent control element 114. As seen in FIGS. 4 and 5, these plungers 118 are provided with axially extending fluid passageways 120 which communicate with the upper horizontal bore 106, and which also communicate with the outer end region of the vent control plungers 118. The vent control plungers 118 are mounted in tubular housings 122 and are movable reciprocally therein to urge the vent control element 114 back and forth within the upper horizontal bore 106. The tubular housings 122 are capped, as at 124, at their ends; and they are provided thereat with centering springs 126 which serve to hold the plungers 118 and the vent control element 114 in a central position as shown in FIG. 1. In this central position of the vent control element 114, its enlarged central portion acts to fully cover the vent opening 104 as shown in FIG. 3.

A pair of proportional control solenoids 128 extend over each of the tubular housings 122 and are operative to urge their respective plungers 118 in a direction toward the vent control housing 100. Since the plungers 118 are in contact with the vent control element 114, the position of this element with respect to the vent opening 104 can be controlled by operation of the solenoids 128. It will be noted that no pressure disturbances are caused directly by the movement of the plungers 118 for their axially extending fluid passageways 120 allow a free flow of fluid to accommodate their longitudinal displacements within the housings 122.

The solenoids 128 are provided with windings 130. These windings are protected by outer tubular armor type coverings 133. One end of each winding is connected to ground as at 132. The other ends of the windings 130 are connected respectively via electrical control lines 134 and 135 to a remote control unit 136. The remote control unit 136 which may be conveniently mounted in the cab of a crane, for example, comprises a housing 138 within which a remote control arm 140 is pivotally mounted for movement in the direction of the arrow B. The remote control arm 140 is formed with a cross arm 142 against which compression springs 144 are biased to urge the arm 140 toward a vertical or a neutral position as shown in FIG. 1. The lower extremity of the remote control arm 140 is provided with a wiper contact 146 to which is connected the positive terminal of a direct current power source such as a battery 148. The wiper contact 146 is arranged to wipe across either of two resistor windings 150 and 152 depending upon the direction in which the remote control arm 140 is pivoted. Each of these resistor arms 150 and 152 is connected to a corresponding one of the electrical control lines 134 and 135. It will be seen then that as the remote control arm 140 is moved in either direction, the wiper contact 146 will place the battery 148 into contact with a portion of one of the windings 150 and 152, and thus causes proportional energization of the associated proportional control solenoid 128. Also, depending upon how far the remote control arm 140 is moved, a different amount of battery potential will be applied to the solenoid and accordingly, a different amount of force will be applied to the corresponding vent control plunger 118.

In operation, the pilot valve unit 70 acts to position the spool 14 of the main hydraulic valve assembly 10 precisely at a given position in accordance with the positioning of the arm 140 in the remote control unit 146. The manner in which this is accomplished can be seen from a comparison of FIGS. 1, 6 and 7 which show respectively the system in neutral, right-hand position, and left-hand position.

When the remote control arm 140 is in its neutral or vertical position as shown in FIG. 1, its wiper contact 146 is completely displaced from either of the potentiometer windings 150 or 152. Accordingly, no voltage is applied to either of the electrical control lines 134 or 135, and neither of the proportional control solenoids 128 is activated. In this situation, the vent control plungers 118 are subject solely to the action of the centering springs 126. They therefore act to maintain the vent control element 114 centered within the vent control housing 100 so that its closure portion 116 fully covers the vertical bore 107 to the vent opening 105.

With the system arranged thusly, both of the channels 103 and 104 in the vent control housing 100 are fully closed at the variable restrictions defined between the closure portion 116 of the vent control element 114 and the central vertical bore 107. The region between the fixed and variable restriction in each channel is thus at pilot pressure, and since each end of the pilot valve cylinder 74 is in communication with these regions, the cylinder 74 is also at the pilot pressure on both sides of the piston 82. This equality of pressure on both sides of the central portion 84 of the piston 82, in combination with the action of the centering spring 98 serves to maintain the piston 82 and the valve spool 14 of the hydraulic valve assembly centered as shown.

To move the valve spool 14 to the right as shown in FIG. 6, the remote control arm 140 of the remote control unit 136 is moved to the left. This brings the wiper contact 146 up onto the winding 152 and imposes a corresponding voltage on the electrical control line 134. This voltage is applied to energize the left hand proportional control solenoid so that it produces a leftward pulling force corresponding to the position of the wiper contact 146 on the winding 152. The solenoid thus acts through the vent control plunger 118 to pull the vent control element 114 leftward to a position where the force of the solenoid is balanced by the opposing force of the pressure differential across the area of the control element 116. Such leftward movement of the vent control element 114 brings its vent closure portion 116 across the vertical bore 107 so that the region of the upper horizontal bore 106 to the right of the vent closure portion 116 becomes exposed to vent pressure. The actual pressure which occurs in this region will depend on the amount by which the vent closure portion 116 exposes the vertical bore 107. Meanwhile the region to the left of the vent closure portion 116 remains at full pilot pressure since it is exposed only to the inlet opening 102. This pressure differential across the vent closure portion 116 of the vent closure element 114, tends to urge the vent control element 114 in a rightward direction. This rightward force is balanced by the leftward force of the left solenoid 130 so that for any given setting or energization of the solenoid the position of the vent control element may be set to a corresponding position. It will be noted that the centering springs 126 play no real part in this positioning; their main function is to achieve centering of the valve control element 114 in the neutral condition.

It will be appreciated that this arrangement allows full control of the position of the vent control element from a remote location simply by moving the control arm 140; and that this positioning of the vent control element 116, effectively controls the direction and amount by which the variable restriction in either of the passages 103 and 104 is opened.

As shown in FIG. 6, the vent control element 114 has been moved to the left, so that its vent closure portion 116 partially opens the variable restriction between the right end of the horizontal bore 106 and the central vertical bore 107. This opens the right-hand channel 104 in the vent control housing 100 and establishes communication through this channel between the pilot inlet opening 102 and the vent opening 105. As a result of the flow of fluid through this channel, a pressure drop takes place between its fixed and variable restrictions; and, as explained previously, the amount of this pressure drop is proportional to the amount by which the vent control element 116 opens the variable restriction.

The right-hand channel 104 is in communication with the right end of the proportional control cylinder 74 so that the pressure therein will also be controlled by movement of the vent control element 114. Meanwhile, the other channel 103 remains closed at its variable restriction by virtue of the vent closure portion 116 of the vent control element fully blocking the central vertical bore 107 from the left end of the horizontal bore 106. This prevents fluid flow through the left-hand channel 103 so that the pressure between its fixed and variable restrictions remains at pilot pressure. This pilot pressure is communicated to the left end of the pilot valve cylinder 74 through the left vertical bore 108. Because of the disparity in pressures thus produced across the central portion 84 of the pilot valve piston 82, the piston will move to the right carrying along with it the valve spool 14 of the hydraulic valve assembly 10. As the piston 82 and the valve spool 14 move, they act through one of the cup shaped elements 92 to stress the centering spring 98. This movement continues to a position where the resistance offered by the spring 98 is balanced by the force differential produced by the different pressures across the proportional control piston 84. Now, by moving the control arm 140 even further, the voltage on the line 135 will be increased as will the force produced by its associated solenoid 128. This in turn will urge the vent control element further to the left, thus opening the variable restriction even further and further decreasing the pressure in the right-hand channel 104. As a result, the pressure differential across the proportional control piston is increased and the piston will move even further to the right, stressing the centering spring 98 until it resists sufficiently to balance the new force differential. The position of the valve spool 14 may thus be precisely controlled in accordance with the position of the remotely located control arm 140.

As illustrated in FIG. 7, when the remote control arm 140 is moved to the right, the left-hand one of the proportional control solenoids 128 becomes energized while the right-hand solenoid remains de-energized. In this situation, the action is reversed from that described above with the vent control element 114 being urged toward the right. This movement brings the vent closure portion 116 of the vent control element to a position where it begins to open the variable restriction in the left-hand channel 103 while, of course, maintaining the variable restriction in the other channel fully closed. This maintains pilot pressure in the right-hand channel 104, and in the right end of the cylinder 74; and at the same time, the flow of fluid through the restrictions in the left-hand channel 103 causes a decrease of pressure therein and in the left end of cylinder 74. Thus the pressure differential across the central portion 84 of piston 84 is reversed and this piston moves to the left until it reaches a position where the stress thus imposed on the centering spring balances this pressure differential.

A modified form of the invention is shown in FIGS. 8 and 9. In this modified form, as in the previously described form, there is provided a proportional control unit 160 which operates to provide precision control of the operation of an hydraulic valve assembly 162. The hydraulic valve assembly, as in the previous embodiment comprises a valve housing 164 through which a valve spool 166 moves longitudinally. The valve assembly contains valve inlet and outlet ports 168 and 170, connected respectively, to a hydraulic pressure source and a reservoir. There are also provided output ports 172 and 174 connected via output lines 176, to a hydraulic unit 178, the operation of which is controlled according to the position of the valve spool 166 within the housing 164.

The pilot valve unit 160 comprises a cylinder 180, on the top of which is mounted a vent control housing 182. A piston 184 is mounted to reciprocate within the cylinder 180 in alignment with the valve spool 166; and it is connected at one end by means of a coupler 186 to the valve spool, for movement thereiwth. A manual control arm 188 is pivotally connected to the opposite end of the proportional control piston 184, and is mounted by means of a link 190 for movement on the outside of the vent control housing 182.

Piston 184 has an enlarged central portion 192 which fits closely within the cylinder 180. The piston has smaller diameter end portions 194 which fit closely through end holes 196 in opposite ends of the cylinder so that the effective piston area on each side of the central portion 192 is the same and is constant irrespective of the position of the piston within its cylinder. Shoulder elements 198 are formed on the piston end portions, and these engage the cylinder end walls to limit the maximum piston stroke. Centering springs 200 are provided within the cylinder 180 to maintain the piston in a normally centered position as shown.

The vent control housing 182 is formed with a pair of longitudinally displaced left and right vertical bores 202 and 204; and a pair of smaller diameter upper and lower horizontal bores 206 and 208 each of which intersects both the vertical bores. The upper horizontal bores 206 extends through one end of the housing 182 and is connected to a pilot pressure line 210. The lower horizontal bore 208 also extends through one end of the housing and is connected to a reservoir line 211.

A pair of solenoid mounting inserts 212 and 214 are fitted into each of the vertical bores 202 and 204. These inserts are bored as at 216, and are counterbored as at 218. The smaller diameter bores 216 extend down past the lower horizontal bore 208 and communicate via aligned vertical passageways 220 and 222 with the proportional control cylinder 180. The larger diameter counterbores 218 extend down beyond the upper horizontal bore 206.

A pair of vent control elements 224 and 226 extend into and fit closely within the bores 216 in the inserts 212 and 214. These vent control elements are formed with axially extending channels 228 which open out at the lower end of the elements via fixed restrictions 230. The vent control elements are dimensioned such that when they are in their depressed positions, as shown, they are effective to block off the flow of fluid between their associated vertical passageways 220 and 222 and the lower horizontal bore 208. Thus depending upon how far either element is raised, there is provided a variable restriction between the passageway 220 or 222 and the lower horizontal bore 208. It will be noted further that the inserts 212 and 214 are provided with inner annular recesses 232 and 234 which prevent the horizontal bores 206 and 208 from being blocked off by the vent control elements 224 and 226.

A pair of vent control plungers 236 and 238 extend upwardly from, and are connected to, the vent control elements 224 and 226. These plungers have axial openings which are in constant communication with the pilot pressure in the upper horizontal bore 206. The plungers 236 and 238 move vertically in tubular sleeves 240 which are fixed in the inserts 212 and 214. A pair of solenoids 242 and 244 are mounted about these sleeves and operate when energized to urge their respective vent control plungers in an upward direction. This upward movement is resisted by internal bias springs 246 mounted within the solenoids and by the pressure differential on each side of vent control elements 224 and 226 when they are displaced vertically upwards.

As shown in FIG. 9, the modified arrangement is provided with a remote control unit 246 which is identical in construction and operation to the remote control unit 136 of the arrangement of FIGS. 1–6. The unit 246 is provided with a control arm 248 which can be moved to produce proportional energization of either of the two solenoids 242 and 244.

The pressure on top of the control elements 224 and 226 is always at full pilot system pressure. The orifices 230 admit this pressure to the lower side of the control elements. However, when a control element is raised, this pressure is proportionally dissipated by venting up to a point where the force produced by the solenoid becomes balanced by the net force resulting from the pressure differential across the central element.

Whenever either solenoid is energized, it urges its associated plunger 236 or 238 upwardly against its bias spring 246. This movement serves to lift the associated vent control element 222 or 224 and open the variable restriction between the associated passageways 220 or 222 and the lower horizontal bore. When this occurs, there is set up an open flow channel from the upper horizontal bore 206, down through the axially extending channel 228 in the now lifted vent control element 224 or 226, into the associated vertical passageway 220 or 222 and out through the now opened variable restriction to the lower horizontal bore 208 and the reservoir. Thus as in the aforedescribed embodiment, the present embodiment provides fluid flow channels between fixed and variable restrictions and places the opposite ends of a proportional control cylinder in fluid communication with each of these channels between their two restrictions. By so doing, one side of the proportional control piston will be exposed to full pilot pressure while its other is exposed to a lesser pressure according to the degree of opening of the variable restriction. This close control of pressure within the proportional control cylinder in turn permits accurate remote positioning of its piston, and, of course, accurate positioning of the valve spool 14 of the hydraulic valve assembly.

The arrangement of FIGS. 8 and 9 makes use of "cartridge type" solenoids and valves which are conveniently removable simply by loosening a nut 250 on the top of the solenoid 244. This allows removal of a cover piece 252 thus exposing the solenoid for inspection and replacement if necessary. Similarly the inserts 212 and 214 may easily be removed with conventional hand tools for exposing all of the valve elements, these being connected to the solenoid core. Thus with a minimum of manipulation, the entire valve and valve actuating assembly may be removed as a unit and conveniently replaced by a similar unit. This, of course, permits repairs to be made in the field with a minimum of lost time.

Having thus described my invention with particular reference to the preferred form thereof, it will be obvious to those skilled in the art to which the invention pertains, after understanding the invention, that various changes and modifications may be made therein without departing from the spirit and scope of the invention, as defined by the claims appended thereto.

What is claimed as new and desired to be secured by Letters Patent is:

1. Hydraulic control apparatus comprising a cylinder having a piston-like element movable therein, conduit means for conveying substantially constant fluid pressure to one end of said cylinder, second conduit means for conveying fluid to the other end of said cylinder to subject said piston-like element to various forces corresponding to the pressure of said fluid within said cylinder, said second conduit conveying means including at least two constrictions therealong and arranged such that said other end of said cylinder is subject to the fluid pressure between them, at least one of said constrictions being variable in size to vary the pressure within said other end of said cylinder resulting in a variable fluid force pressure differential on said piston-like element and further solenoid means arranged about said cylinder to apply forces directly to said piston-like element to counter said fluid pressure differential and move said piston-force like element, the size of said variable constriction being controlled by said movement of said piston-like element.

2. Hydraulic positioning apparatus comprising a first hydraulic cylinder having a first piston movable therein, resilient means biasing said first piston toward a given position within said first cylinder, a second hydraulic cylinder having a plunger movable therein, fluid conduit means for conveying fluid from a high pressure region to one end of said second cylinder, second fluid conduit means for conveying fluid from a high pressure region to a low pressure region and passing said low pressure fluid through the other end of said second cylinder, said second fluid conduit means including at least two constrictions therealong, one of said constrictions being formed and made variable in size by the gradual covering and uncovering of an opening in said second cylinder by said plunger as it moves therein, solenoid means positioned about said cylinder and acting on said plunger for selectively controlling the position of said plunger within said second cylinder and means for placing one end of said first cylinder in fluid communication with the variable pressure between said two constrictions.

3. Apparatus for producing proportional hydraulic control, said apparatus comprising a hydraulic cylinder, a piston fitted into said cylinder for movement in response to pressure differentials across said piston, centering spring means arranged to bias said piston toward a given position in said cylinder, means defining a pilot pressure channel and a vent channel and first and second intermediate passageways connected in parallel between each channel, each of said passageways including as an end portion thereof a longitudinal bore common to both pasageways, with said vent channel opening into said bore at an intermediate location therealong, a spool valve element movable longitudinally along said bore, said spool valve element having a large diameter portion which fits closely in said bore and which fully covers the vent channel opening at a central position thereof so that movement of said valve element in either direction causes variable opening of a variable restriction along a different one of said passageways, means defining a fixed restriction further along each passageway, means defining third and fourth passageways extending respectively from the region between the fixed and variable restriction in each passageway and an associated end of said cylinder, and means operative to move said spool valve element.

4. Apparatus as in claim 3 wherein said spool valve element moving means comprises a pair of solenoids arranged in opposition to each other and having movable plungers aligned with and connected to opposite ends respectively of said spool valve element, means resiliently biasing said plungers to a central position commensurate with the central position of said spool valve element and means arranged to selectively energize said solenoids.

5. Apparatus as in claim 3 wherein said last mentioned means comprises a pair of displaced electrical resistance windings each connected at one end to one end of an associated solenoid winding, the other end of each solenoid winding being grounded, a common voltage source connected between ground and a wiper contact, and a movable arm mounting said wiper contact to move along in contact with said winding.

6. Apparatus for producing proportional hydraulic control, said apparatus comprising a hydraulic cylinder, a piston fitted into said cylinder for movement in response to pressure differentials across said piston, centering spring means arranged to bias said piston toward a given first position in said cylinder, a vent control housing mounted on top of said cylinder and having first and second internal bores communicating respectively with opposite ends of said cylinder and further having first and second internal passageways each of which intersect both bores, said passageways further being adapted to be connected respectively to a pilot pressure source and to a vent, a pair of plungers mounted for reciprocal movement in said bores and shaped to effect, upon such movement, variable communication between one of said passageways and the region of its respective bore nearest said hydraulic cylinder, said plungers further being formed with axially extending passageways formed with fixed restrictions, said axially extending passageways on one side of said fixed restrictions being in fluid communication with the other passageway in said vent control housing for all positions of said plungers, said axially extending passageways on the other side of said fixed restrictions opening into the region of its respective bore nearest said hydraulic cylinder, and means for controlling the reciprocal movement of said plungers.

7. Hydraulic control apparatus comprising a cylinder having a piston like element movable therein, means for conveying fluid to one end of said cylinder to subject said piston like element to various forces corresponding to the pressure of said fluid within said cylinder, said conveying means including at least two constrictions therealong and arranged such that said one end of said cylinder is subject to the fluid pressure between them, at least one of said constrictions being variable in size to vary the pressure within said one end of said cylinder to change the fluid force on said piston like element and further means arranged to apply forces to said piston like element to counter said fluid force, said one end of said cylinder is arranged along said conveying means such that said fluid flows into and out of said one end of said cylinder in passing from one constriction to the other and wherein one of said constrictions is controlled in size in accordance with the position of the piston like element, said one constriction is formed by the cooperation of an edge of said piston like element with an opening in the side of said cylinder leading from said one end of said cylinder to said conveying means, said piston like element is double acting and said conveying means includes a first conduit divided into two branches, each provided with a fixed constriction and each leading into a different end of said cylinder, said conveying means further including a single conduit opening into said cylinder along its side wall to be opened alternately and variably into different ends of said cylinder according to the position of said piston like element.

8. Hydraulic positioning apparatus comprising a first hydraulic cylinder having a first piston movable therein, resilient means biasing said first piston toward a given position within said first cylinder, a second hydraulic cylinder having a plunger movable therein, fluid conduit means for conveying fluid from a high pressure region to a low pressure region and passing through one end of said second cylinder, said fluid conduit means including at least two constrictions therealong, one of said constrictions being formed and made variable in size by the gradual covering and uncovering of an opening in said second cylinder by said plunger as it moves therein, means for selectively controlling the position of said plunger, within said second cylinder and means for placing one end of said first cylinder in fluid communication with the variable pressure between said two constrictions, the other of said constrictions is located in said fluid conduit means at a location such that said one end of said second cylinder is effectively between said two constrictions so that the fluid pressure on said plunger varies with its position in said second cylinder, and wherein said means for controlling the position of said plunger within said second cylinder comprises a force producing means arranged to produce a controllable force on said plunger which moves to vary said one constriction and the fluid pressure on said plunger until it balances said controllable force.

9. Apparatus as in claim 8 wherein said means to produce a controllable force comprises a solenoid and circuit means for remotely controlling the energization of said solenoid.

10. Hydraulic positioning apparatus comprising a first hydraulic cylinder having a first piston movable therein, resilient means biasing said first piston toward a given position within said first cylinder, a second hydraulic cylinder having a plunger movable therein, fluid conduit means for conveying fluid from a high pressure region to a low pressure region and passing through one end of said second cylinder, said fluid conduit means including at least two constrictions therealong, one of said constrictions being formed and made variable in size by the gradual covering and uncovering of an opening in said second cylinder by said plunger as it moves therein, means for selectively controlling the position of said plunger within said second cylinder and means for placing one end of said first cylinder in fluid communication with the variable pressure between said two constrictions, said cylinders and their associated piston and plunger are double acting and the corresponding ends of said cylinders are in fluid communication, and wherein said fluid conduit means comprises a pair of branches, each having an associated constriction located therealong, and each branch communcating with a different end of said second cylinder, each of said branches further including a second constriction alternately openable in variable fashion by the clearance of an opening in the side wall of said second cylinder upon the passage thereover of said plunger, said second constriction is common to both branches and is formed by the cooperation of the side of said plunger with an opening located centrally of the side wall of said second cylinder, said opening forming a portion of said fluid conduit means, said one constriction in each branch is located such that the ends of said second cylinder are effectively between the two restrictions in each branch and wherein said means for controlling the force on said plunger operates in opposition to the resulting change in fluid force produced on said plunger upon movement thereof whereby a force balance effect is achieved to control the pressure in said first cylinder and thereby to move said first piston a corresponding amount.

References Cited

UNITED STATES PATENTS

| | | | |
|---|---|---|---|
| 2,655,940 | 10/1953 | Jackson | 251—137 |
| 2,704,649 | 3/1955 | Ellenberger | 251—137 |
| 2,912,008 | 11/1959 | Blackburn | 251—137 |
| 2,967,545 | 1/1961 | Schmidt | 251—137 |
| 2,977,985 | 4/1961 | Ericson | 91—51 |
| 2,983,278 | 5/1961 | Heintz | 91—51 |
| 3,318,332 | 5/1967 | Lansky | 91—51 |
| 2,624,585 | 1/1953 | Churchill | 137—625.64 |
| 3,269,417 | 8/1966 | Lansky | 137—625.64 |
| 2,931,389 | 4/1960 | Moog | 137—85 |

FOREIGN PATENTS

| | | |
|---|---|---|
| 670,685 | 9/1963 | Canada. |
| 957,900 | 5/1964 | Great Britain. |

PAUL E. MASLOUSKY, *Primary Examiner.*

U.S. Cl. X.R.

91—459; 137—625.61, 625.64; 251—137, 141